J. HIST.
DROPPING DEVICE FOR POTATO PLANTERS.
APPLICATION FILED DEC. 27, 1910.
1,035,191.
Patented Aug. 13, 1912.
3 SHEETS—SHEET 3.
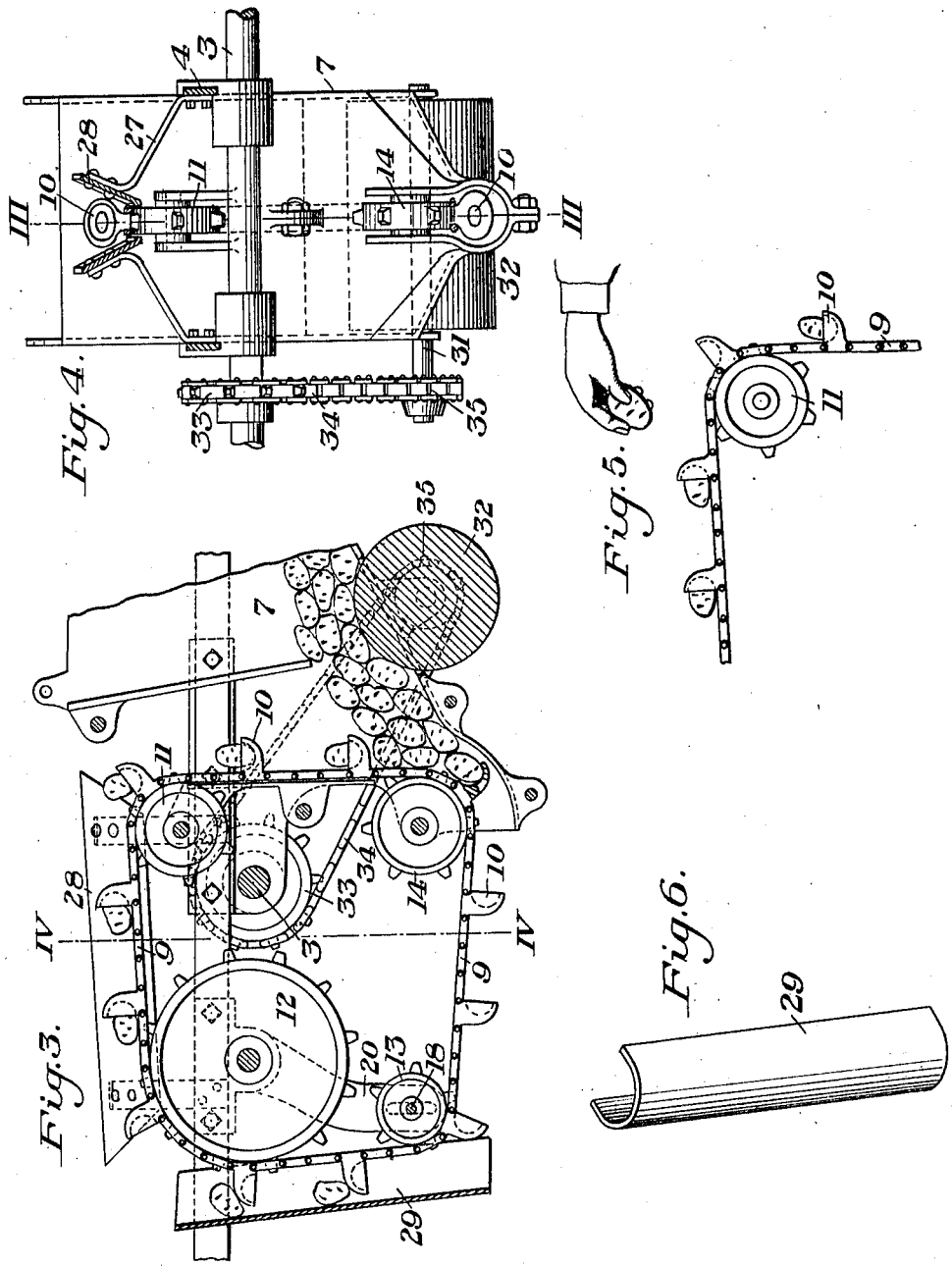

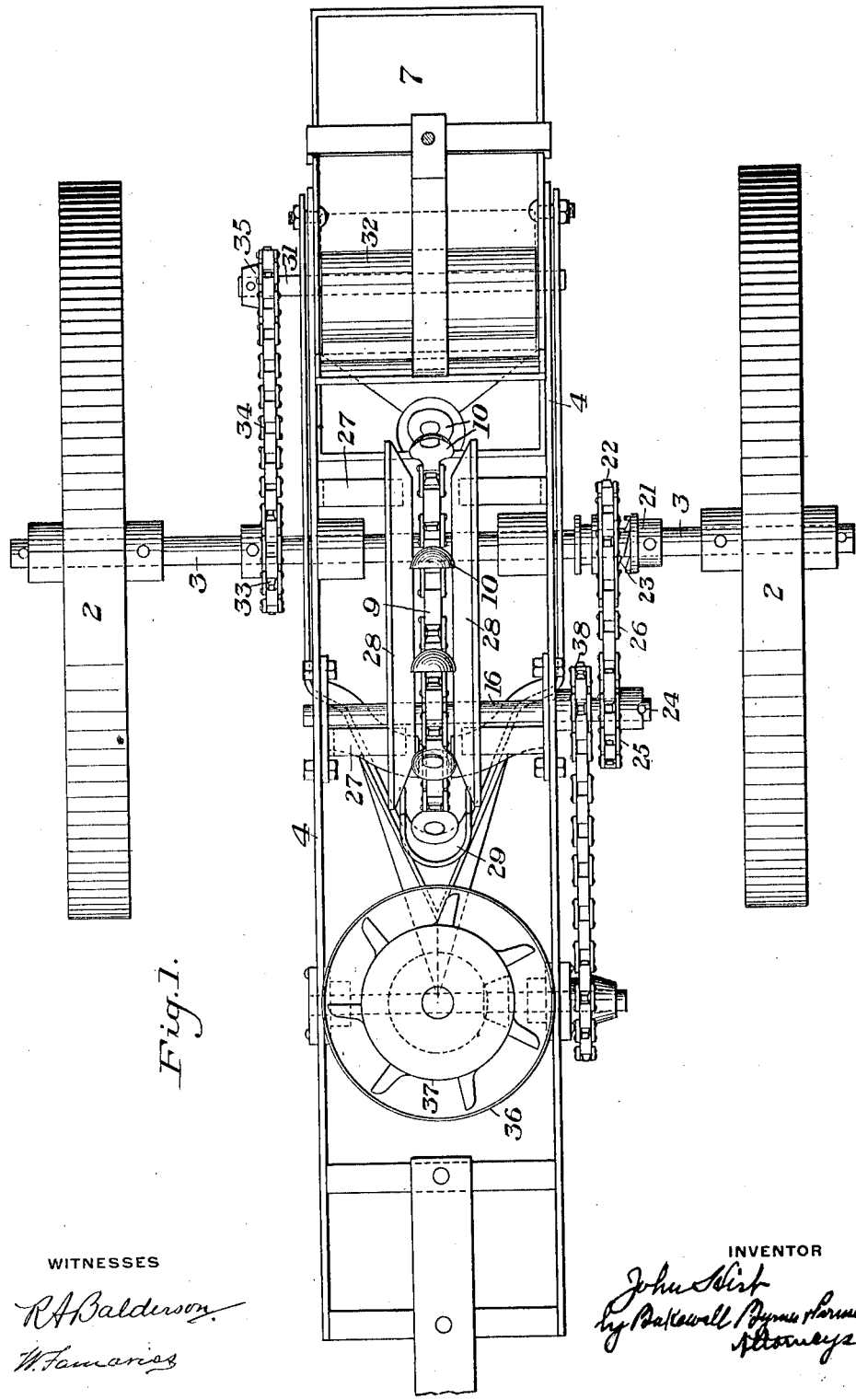

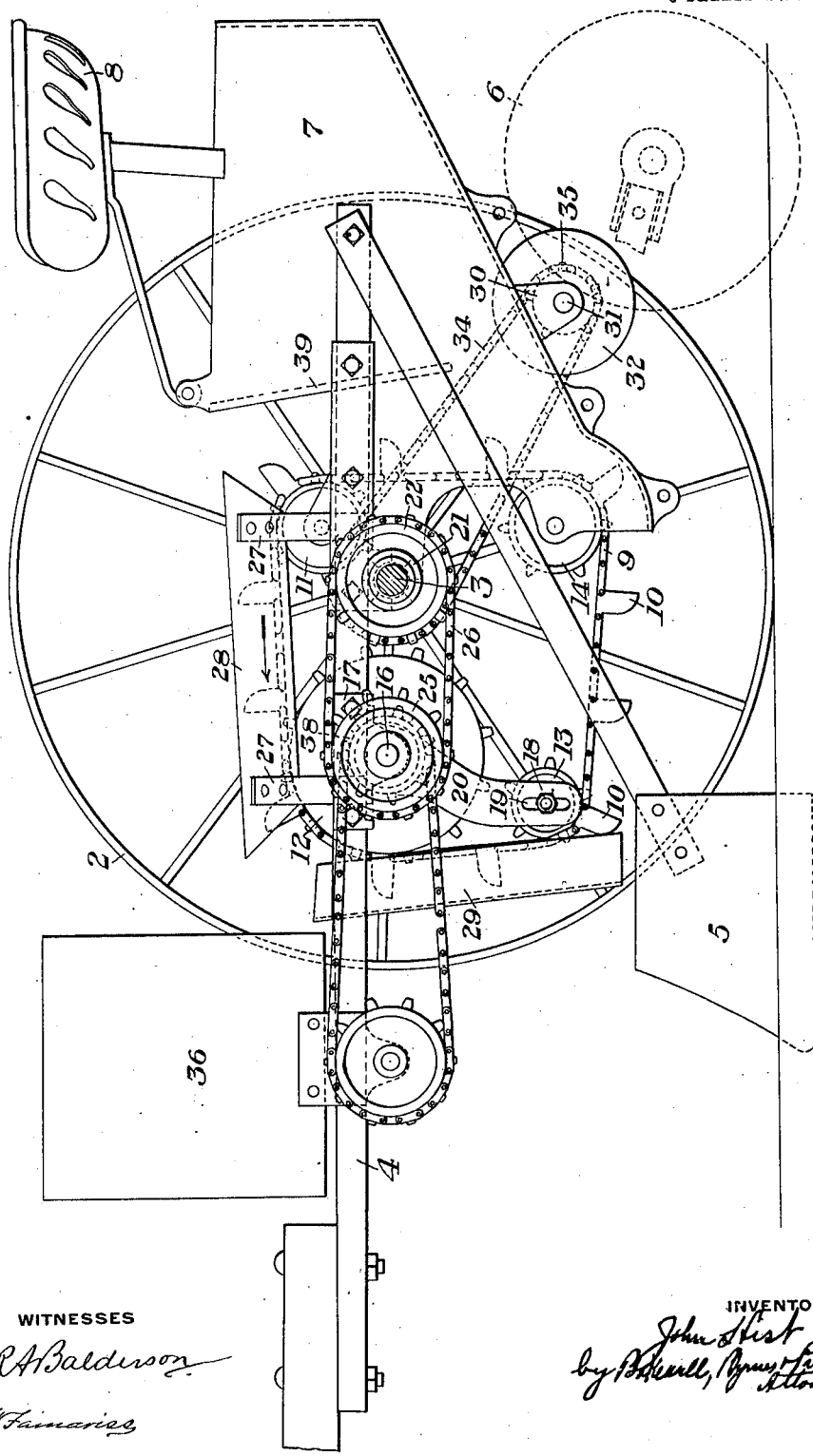

UNITED STATES PATENT OFFICE.

JOHN HIST, OF BEREA, OHIO.

DROPPING DEVICE FOR POTATO-PLANTERS.

1,035,191. Specification of Letters Patent. Patented Aug. 13, 1912.

Application filed December 27, 1910. Serial No. 599,579.

*To all whom it may concern:*

Be it known that I, JOHN HIST, a resident of Berea, in the county of Cuyahoga and State of Ohio, have invented a new and useful Improvement in Dropping Devices for Potato-Planters, of which the following is a full, clear, and exact description, reference being had to the accompanying drawings, forming part of this specification, in which—

Figure 1 is a plan view of one form of my improved potato dropping device shown in connection with a portion of a potato planter. Fig. 2 is a side elevation partially in section of the same. Fig. 3 is a longitudinal section on the line III—III of Fig. 4. Fig. 4 is a transverse section on the line IV—IV of Fig. 3. Fig. 5 is a detail side view of a portion of the conveyer chain illustrating the method in which a potato may be dropped in one of the buckets if it failed to pick a potato from the hopper, and Fig. 6 is a perspective view of the dropping chute.

This invention relates to dropping devices for potato planters, and is designed to provide a cheap and efficient device of this character, whereby the operator is enabled to see whether a potato has been picked up by each picker device so as to be sure that a potato will be dropped on to the ground by means of each of the dropping devices.

A further object of my invention is to provide a feeding roller in the hopper to feed the potatoes forward to the throat thereof, so that the potatoes will always lie in line of movement of the conveyer, and which is so arranged that it will feed the potatoes forward without bruising or crushing them.

I am aware that it is old to feed the potatoes forward by means of a roller or feeding device which is located above the bottom of the hopper and which will feed the potatoes forward between it and the bottom of the hopper. The disadvantage of a feeding mechanism of this character is obvious, as the potatoes are liable to be mashed between the roller and the bottom of the hopper.

The precise nature of my invention will be best understood by reference to the accompanying drawings, which will now be described, it being premised, however, that various changes may be made in the details of construction and general arrangement of parts without departing from the spirit and scope of my invention, as defined in the appended claims.

In the drawings the numerals 2 designate the supporting wheels which are secured to a shaft or axle 3. Mounted on the axle 3 is the frame 4, to which is connected a plow 5 and the covering disks 6, illustrated in dotted lines in Fig. 2. The plow and covering disks may be connected to the frame in any desired manner. Connected to the rear end of the frame 4 is the potato hopper 7, and mounted above the hopper is the operator's seat 8.

9 is a conveyer chain which is provided with a plurality of buckets 10. This conveyer chain is arranged to be moved over the sprocket wheels 11, 12, 13 and 14. The sprocket wheels 11 and 14 being mounted in bearings on the front portion of the hopper 7. The sprocket wheel 12 is rigidly connected with a shaft 16 journaled in brackets 17 connected to the main frame 4. The sprocket wheel 13 is rotatably mounted on a pin 18 which is adjustable in slots 19 in the brackets 20, secured to the opposite sides of the frame, and by shifting the sprocket wheel the tension of the conveyer chain can readily be adjusted.

Connected to the axle 3 is a fixed clutch member 21, and 22 is a sprocket wheel loosely mounted on the shaft 3 which is provided with a clutch member 23 arranged to engage the clutch member 21 when shifted longitudinally on the shaft, and is arranged to rotate the conveyer sprockets in a manner hereinafter described. Connected to the shaft 16 by a pin 24 is a sprocket wheel 25, which may be replaced by a sprocket wheel of larger or smaller diameter to change the speed of the conveyer with relation to the travel of the wheels 2, so as to drop the potatoes the required distance apart.

26 is a conveyer driving chain which connects the sprocket wheel 22 with the sprocket wheel 25 and when the sprocket wheel 22 is in clutching engagement with the clutch member 21, the conveyer will be moved in the direction indicated by the arrow in Fig. 2.

Connected to each side of the frame 4 are the brackets 27 and connected to these brackets are the plates 28, one on each side of the conveyer chain, and are arranged to form a trough to retain the potatoes on the chain while traveling in a horizontal direction from the hopper to the point where the potatoes are dropped to the ground.

29 is a vertical trough in the forward portion of the machine through which the chain and buckets travel on their downward movement, and which is also arranged to hold the potatoes on the chain so as to drop them after the buckets pass beyond the lower portion thereof.

Journaled in the downwardly extending arms 30 from the hopper 7 is a shaft 31 on which is mounted a roller 32 extending through the bottom of the hopper 7, which is arranged to feed the potatoes forwardly to the throat of the hopper, as clearly indicated in Fig. 3. Connected to the axle 3 is a sprocket wheel 33 which is connected by means of a sprocket chain 34 with a sprocket wheel 35 on the end of the shaft 31, to rotate the feeding roller or drum 32.

Mounted on the forward end of the frame 4 is a fertilizer box 36, which is provided with a distributer 37 arranged to be driven by a sprocket wheel 38 connected to the shaft 16. The box 36 may be provided with a seat for the driver.

The operation of the device is as follows: The clutch is thrown into engagement so as to drive the conveyer, and as the planter is moved over the ground, the plow 5 will open up the furrow and the conveyer will be moved in the direction indicated by the arrow in Fig. 2 and pick up a potato with each bucket, the conveyer is then moved in a horizontal direction through the trough formed by the plates 28 and the operator on the seat 8 will be able to see whether a potato has been picked up by each of the buckets, and, if one of them has missed, he can drop a potato on the conveyer in front of the bucket which has not picked up a potato, in the manner clearly illustrated in Fig. 5. The conveyer then passes around the sprocket wheel 12 and down through the chute 29, the potatoes dropping forward from the one bucket to the next bucket, but will not be permitted to drop out of the chute until after the bucket in advance is moved from the chute. The buckets are then moved along in a horizontal direction and into the throat of the hopper, the throat of the hopper being of sufficient length to permit one bucket to enter the mouth of the throat before the other bucket has passed out of the other end thereof, which will prevent the potatoes from dropping out through the throat. The potatoes are fed forward by the feed roller 32, but are prevented from moving forward too rapidly by means of the wall 39 in the hopper.

The advantages of my invention result from the provision of a dropping device for a potato planter in which the operator is enabled to see whether each bucket picks up a potato from the hopper and in which the conveyer travels over a sufficient space to enable him to place a potato in the bucket which has missed. Another advantage results from the provision of means for positively feeding the potatoes forward by means of a roller extending through the bottom of the hopper whereby they are fed to the throat thereof without bruising or crushing them.

I claim:

1. A potato planter having a hopper to contain the potatoes, an endless conveyer having buckets thereon arranged to be moved through said hopper in a general vertical direction for a substantial distance to permit the surplus potatoes to drop back into the hopper, a wheel over which the conveyer passes at the top of its travel adjacent to the hopper, and another support spaced apart from said wheel and causing the conveyer to move in a generally horizontal direction for a sufficient distance after it leaves said wheel to permit the operator to fill the empty buckets; substantially as described.

2. A potato planter having a hopper for the potatoes, an endless conveyer having potato holding devices arranged to be moved upwardly through said hopper to an upper wheel for a substantial distance to permit the surplus potatoes to drop back into the hopper, and another wheel coöperating with said upper wheel and spaced apart therefrom, said wheel being arranged to give the conveyer a horizontal travel in its upper path a sufficient distance to permit the operator to fill the empty holding devices; substantially as described.

3. A potato planter having a relatively wide hopper for the potatoes, a narrow endless conveyer having buckets arranged to be moved upwardly through said hopper to an upper wheel for a substantial distance to permit the surplus potatoes to drop back into the hopper, another wheel coöperating with said upper wheel and spaced apart therefrom, said wheels being arranged to give the conveyer a horizontal travel in its upper path a sufficient distance to permit the operator to fill the empty buckets, and plates arranged to hold the potatoes on the conveyer in its upper horizontal travel; substantially as described.

4. A potato planter having a relatively wide hopper for the potatoes, a narrow endless conveyer having buckets arranged to be moved upwardly through said hopper for a substantial distance to permit the surplus potatoes to fall back into the hopper, a wheel over which the conveyer passes after leaving the hopper, another wheel spaced apart from said upper wheel, said two wheels coöperating to give the conveyer a generally horizontal travel in its upper portion a sufficient distance to permit the operator to fill the empty buckets, and a vertically extending guide trough through which the conveyer passes after it leaves the second
5 wheel which holds the potatoes on the backs of the buckets during their downward travel; substantially as described.

In testimony whereof, I have hereunto set my hand.

JOHN HIST.

Witnesses:
B. E. DUNHAM,
A. J. DEEX.

Copies of this patent may be obtained for five cents each, by addressing the "Commissioner of Patents, Washington, D. C."